Dec. 22, 1936. H. C. KNERR ET AL 2,065,379
METHOD AND APPARATUS FOR TESTING METAL ARTICLES FOR DEFECTS
Filed Jan. 30, 1932 2 Sheets-Sheet 1

Inventors
HORACE C. KNERR
& CECIL FARROW
By Richey & Watts
Attorneys

Dec. 22, 1936.    H. C. KNERR ET AL    2,065,379
METHOD AND APPARATUS FOR TESTING METAL ARTICLES FOR DEFECTS
Filed Jan. 30, 1932    2 Sheets-Sheet 2
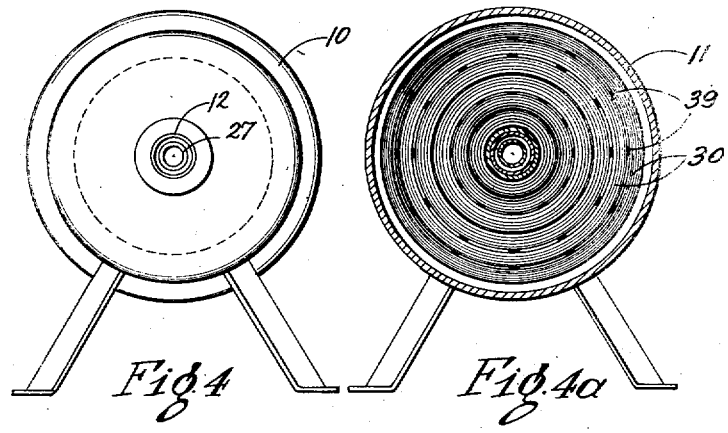
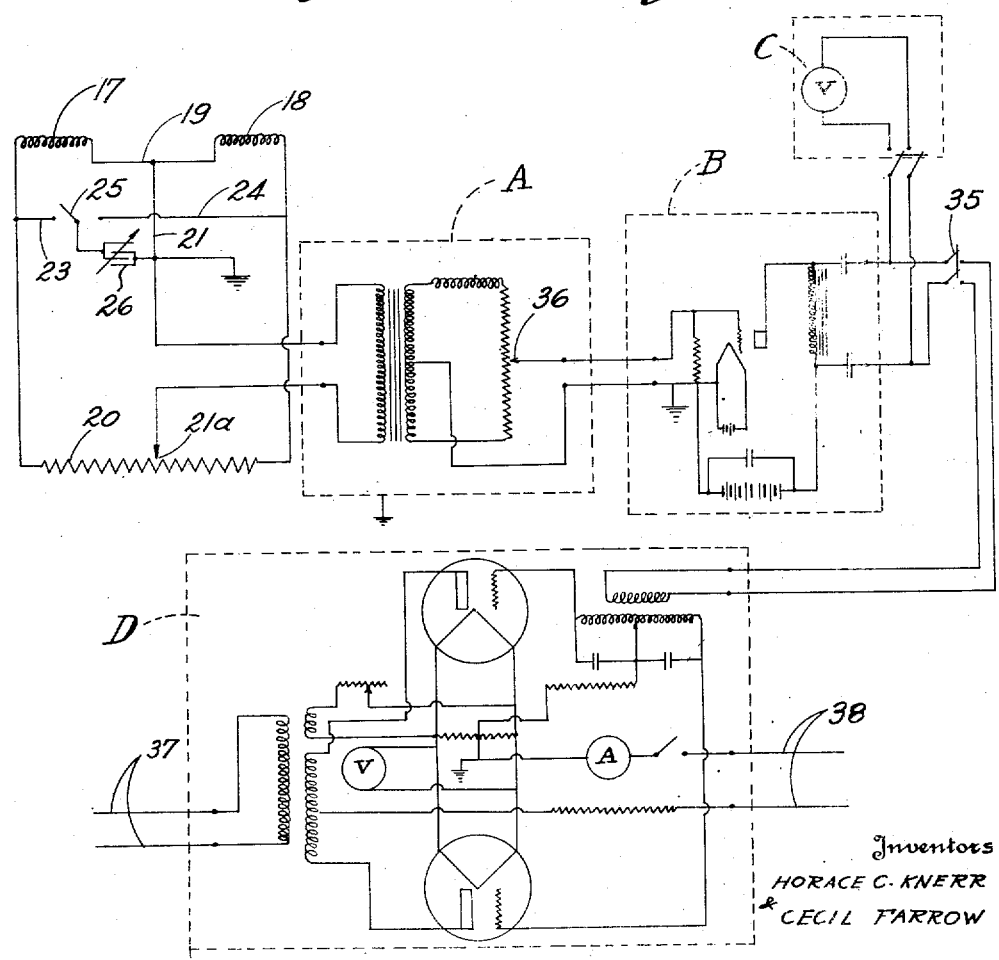
Inventors
HORACE C. KNERR
& CECIL FARROW
BY Richey & Watts
Attorneys Patented Dec. 22, 1936

2,065,379

UNITED STATES PATENT OFFICE 2,065,379

METHOD AND APPARATUS FOR TESTING METAL ARTICLES FOR DEFECTS

Horace C. Knerr and Cecil Farrow, Philadelphia, Pa., assignors, by direct and mesne assignments, to Steel & Tubes, Inc., Cleveland, Ohio, a corporation of Ohio Application January 30, 1932, Serial No. 589,888

37 Claims. (Cl. 175—183)

REISSUED

FEB 14 1939

The present invention relates to a method of testing metallic articles for defects. It may be practiced on many different articles such as tubes, bars, rods and structural shapes. The articles may be of long or short axial length, but long articles should preferably, although not necessarily be substantially constant in cross section.

The invention also relates to a new and improved apparatus for carrying out the process.

This process is particularly suited to the detection of defects of appreciable axial length in metal articles. For example, it is sensitive to a defect of the order of about $\frac{1}{16}$" or more in axial length but is comparatively insensitive to extremely short defects such as the discontinuity which would exist between two articles placed end to end against each other. The method is particularly sensitive to defects in the portions of the articles remote from the axis. For example, defects in a tube wall or defects in the outer parts of a rod are readily detectable by this method.

This method is capable of detecting, under the foregoing conditions, defects such as cracks, crevices, pits, inclusions of slag or other foreign material, imperfectly welded seams of tubes or variations in the wall thickness of tubes.

For many uses, tubes, rods, bars and other articles comprehended herein, it is desirable that the presence of defects should be determined before much time and labor has been expended on such materials, while, for other uses it is often vital that defects be detected before actual use is made of the material. Often the defects are not visible, or are detected by the eye only with difficulty, and for many uses even concealed or apparently small defects may be very important. For example, great care must be exercised in selecting tubes for use in aircraft construction. A tube which has a longitudinal defect, however small, extending partially through its wall may fail in the locality of the defect when subjected to repeated reversals of stresses such as may occur in airplane service.

Various methods of testing tubes, bars, rods and the like, are now in common use, but these methods do not entirely satisfy the demand for a method that will detect the small defects of the character above mentioned, particularly such longitudinally extending defects.

The present invention embodies certain advantageous features of construction and methods disclosed but not claimed in the co-pending application of Horace C. Knerr, Serial No. 589,887, filed January 30, 1932, and is based fundamentally, on the fact that defects of the foregoing character in metal articles vary the reactions of the articles on current flowing therein. The invention of that Knerr application as well as of this application utilizes these reactions and their variations to locate the defects and does so independently of the magnetic characteristic of the material of which the articles are composed. In a simple form the invention may be carried out by causing current to flow in and partially or entirely around an article of the foregoing description and determining the reactions of the article on such current flow. Current may be supplied by a suitable source directly to the article, or it may be induced in the article by a flow of current in a conductor extending around the article. The current, whether set up directly or by induction, may be designated as an "exciting" current. The current which sets up the "exciting" current may be termed "energizing" current; and in certain instances may be direct current which is constant, interrupted or pulsating, while in other instances it may be alternating current.

The application of Knerr hereinbefore mentioned claims broadly the apparatus and methods disclosed herein and claims or may claim more specifically certain things such as the determination of the resistance of a part of or all the outer portion of the article to the flow of exciting current therearound or the impedance of the article to the flow of current. This application is mainly concerned with apparatus and methods for the detection of predetermined variations in the nature and magnitude of the current caused by defects in the article, that is, changes in the total amount of current; small phase angle shifts of current flowing around the article. Determinations may be made on the article being tested by comparing the reactions and their variations on the exciting current caused (a) by different parts of the article or (b) by the article as compared with those a similar, but satisfactory or standard article would have under the same conditions, or (c) by the article as compared with those of a similar but satisfactory or standard article.

A preferred form of apparatus for practicing this invention comprises a set of primary and secondary coils, one set surrounding the article being tested and the other surrounding a similar standard article, with means including a Thyratron tube circuit to detect small phase angle shifts. (A Thyratron tube is an electric tube known by that name now being made by the General Electric Company and possessing the property of extreme sensitivity to small phase angle shifts.) The Thyratron tube circuit may be connected in series with the secondary coils to compare voltages or current therein and may be employed in apparatus which may or may not include sets of direct current coils disposed around the two articles respectively and connected to a source of direct current sufficiently great to set up magnetic flux to saturate the material of the articles to the extent of rendering the articles non-magnetic with respect to the exciting current.

The present invention may be better understood and the numerous advantageous features will be apparent from the following detailed description of certain forms of apparatus and methods employed in carrying out the invention.

In the drawings:

Figures 4 and 4A are end and vertical sectional views of the coil unit of Figure 3.

Figure 5 is a wiring diagram showing the circuit of a Thyratron tube circuit with the apparatus of Figures 1 or 2.

Figures 1, 2, 3:
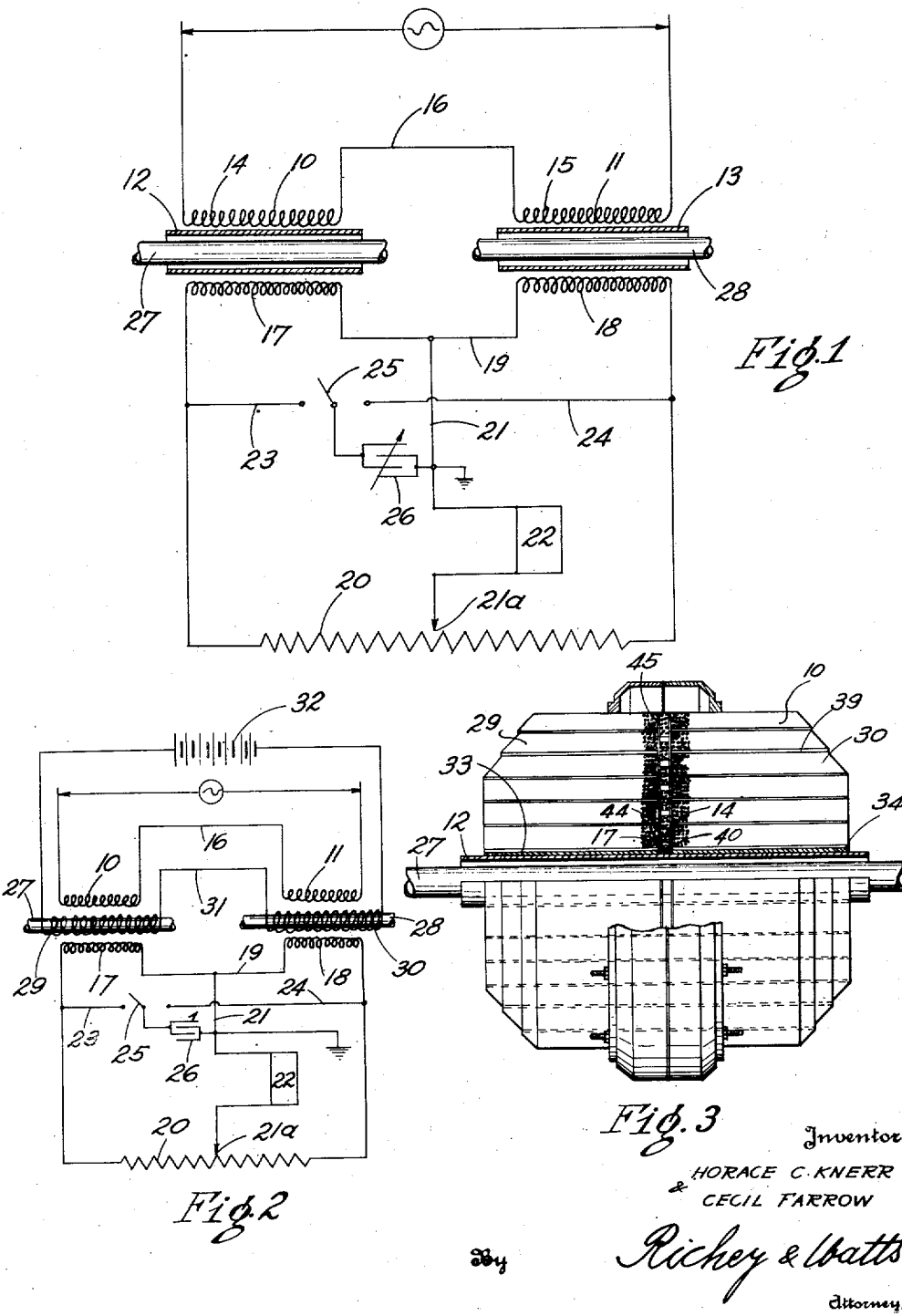
Figure 1 is wiring diagram showing the apparatus for testing non-magnetic materials in accordance with this invention.
Figure 2 is a wiring diagram similar to Figure 1 but showing apparatus for testing magnetic materials.
Figure 3 is a side elevation, partly in section, of a coil unit.

In Figure 1 is shown diagrammatically, apparatus in conjunction with which the present invention may be practiced for use in testing metal tubes composed of non-magnetic material. Two test devices designated as entireties by characters 10 and 11, consist, respectively, of assembly tubes 12 and 13, preferably composed of non-magnetic material upon which are wound respectively primary coils 14 and 15 connected in series as at 16 and also connected to a suitable source of alternating energizing current (not shown). The secondary coils 17 and 18 respectively are also mounted on tubes 12 and 13 and joined together in series as at 19 and are also connected together through resistance 20. A conductor 21 extends from line 19 and a line connected thereto makes sliding contact at 21a with the resistance 20 for adjustment purposes. Included in series with the lines 21 and 21a is suitable apparatus 22 for indicating a phase angle shift of the current, which apparatus will be referred to more in detail hereinafter. Leads 23 and 24 from coils 17 and 18 respectively may be connected through a double throw switch 25 and variable condenser 26. Tubes 12 and 13 are of suitable diameter so that a standard tube 27 and a test tube 28 respectively may be concentrically mounted therein and/or move axially therethrough.

In Figure 2 is shown diagrammatically the apparatus of Figure 1 adapted for use in testing tubing composed of magnetic material. In addition to the apparatus of Figure 1, Figure 2 includes direct current coils 29 and 30 suitably disposed around tubes 27 and 28, respectively, connected in series as at 31 and connected to a suitable source of direct current such as a battery 32. If a generator is employed instead of the storage battery 32, care should be taken that any alternating current components in the direct current coils shall be substantially offset by the alternating current in the primary coils 14 and 15 so as to exert no detectable effect on the induced current in the secondary coils 17 and 18. This may be done by suitably arranging the connections of the coils.

The apparatus 22 for determining and indicating the phase angle shift is shown in detail diagrammatically in Figure 5. It comprises a variable phase control device A, a vacuum tube amplifier device B, a voltmeter device C and a Thyratron tube device D.

When the apparatus of Figure 5 is employed with the apparatus shown in Figures 1 and 2 and when the current in coils 17 and 18 is to be balanced preliminary to testing, the device D is disconnected, as by opening Thyratron grid switch 35, then the primary coils 14 and 15 are energized with the tubes 27 and 28 in place as shown in Figure 1 and the currents flowing in the coils 17 and 18 are balanced. This balancing is accomplished by throwing switch 25 alternately into contact with leads 23 and 24 and shifting contact 21a along 20 and varying the setting of the condenser 26. In some instances it may be necessary to shift contact 21a and then partially balance the coils in the two circuits 17 and 18 by adjustment of the condenser 26, then again shift contact 21a and repeat the adjustment of the condenser until finally the current flow in these two coils are in substantial balance. Then the coils are unbalanced to a predetermined amount, as by shifting the sliding contact 21a on resistance 20, and the switch 35 is thrown to connect the device D with the other devices of Figure 5. The sliding contact 36 in the variable control device A is adjusted until the Thyratron device D will pass little or no current when the smallest defect to be located is present in the portion of the article under test, but will pass full current when a smaller defect is present. Then the tube 28 under test is passed axially through device 11 and the locations of defects in the tube are located by observing what portion of the tube is within the primary coil 15 of the device 11 when little or no current flows through the Thyratron tubes. This operation is preferred because it not only indicates the presence of defects but also gives an indication as to whether or not the Thyratron tube device is functioning properly. For example, if the Thyratron tube should fail to function in detecting defects, this failure would at once result in cessation of flow of current through the tube device. Accordingly, this operation is preferred. However, if desired, the tube device may be arranged to pass full current when defects to be detected are present and little or no current when the tube is free from defects above the minimum size to be detected.

The tube device may be adjusted so as to distinguish defects of different magnitudes above the minimum size to be detected. Normally the plate and grid voltages are about 180° apart and no variation in magnitude of defects is indicated but if the grid voltage is advanced slightly, for example 10°, the variation in magnitude of different defects are indicated.

If the article being tested is composed of magnetic material the direct current coils 29 and 30 are energized before the apparatus is adjusted as aforedescribed.

The output from the Thyratron tube circuit through conductors 38 may be used directly, or amplified, and then used, to actuate mechanism, such for example as a paint spraying device to mark the article being tested to indicate the location of detected defects. The leads 37 carry energizing current, preferably alternating current of the same frequency as that supplied to the primary coils, to energize the Thyratron tube circuit.

In Figures 3 and 4 are shown the test units previously referred to as entireties by characters 10 and 11. In Figures 4 and 4A these units are shown side by side in the position they may occupy in a commercial testing apparatus embodying the present invention. Since these test devices are alike in substantially all respects only one will be described in detail. The device 10 consists of an assembly tube 12 in which a tube 27 may be disposed concentrically and if desired may be passed axially therethrough. On tube 12 are mounted the two similar tubes 33 and 34 and upon each of these latter tubes, direct current coils 29 and 30 respectively are wound. Spacers 39 extending parallel to the axis of the coils are disposed at circumferentially spaced points to provide passages between the turns for cooling fluid such as oil to flow under pressure to maintain the coils at a constant uniform temperature.

Between the coils 29 and 30 a flat or pancake winding 44 is disposed. This unit consists of a short tube 40 resting on assembly tube 12 and having wound directly thereon the secondary coil 17. The primary coil 14 is wound on a non-conducting tube disposed around the secondary coil. Sufficient turns of direct current coils are disposed about the secondary coil 17 to make the total diameter of the pancake coil substantially the same as that of coils 29 and 30. Spacers similar to 39 are provided in the direct current windings to permit the passage of cooling fluid therethrough, and in addition radial strips 45 are provided along the sides of the pancake coil to permit the passage of cooling fluid between the coils 29 and 30. Primary, secondary and direct current coils just described are enclosed in a case and cooling liquid, preferably oil, is pumped into the case under pressure so that it will flow through all of the passages in the coils and keep the entire device at a constant uniform temperature.

In testing steel tubing having a wall thickness of up to about 14 U. S. S. gauge, for example, an alternating current of about 500 cycles had been found satisfactory for energizing coils 14 and 15 and a direct current of about 40,000 ampere turns is sufficient to saturate magnetically the part of a 14 gauge one inch steel tube in unit 10 or 11. For such tubing the primary coils 14 and 15 may each consist of 100 turns of No. 22 enameled cotton covered wire while the secondary coils 17 and 18 may each consist of 300 turns of No. 40 enameled cotton covered wire.

Having thus described our invention so that those skilled in the art may be able to practice the same, what I desire to secure by Letters Patent is defined in the appended claims.

What is claimed is—

1. Apparatus for testing metal articles for longitudinal defects including in combination a test unit comprising primary and secondary windings having suitable means for placing a metal article to be tested in inductive relation to said windings, means for causing a current of substantially predetermined magnitude and phase to flow thru the primary winding, means for causing current of substantially predetermined magnitude and phase normally to flow thru the secondary winding, and means cooperating with the secondary winding for detecting variations in the article being tested, said means including a grid controlled, arc discharge device, such as Thyratron tube, operative when the current flowing in the secondary circuit controls the grid voltage of such discharge device in such a manner that variations of a predetermined nature in the article being tested will cause the grid voltage to pass thru a small angle positioned approximately 180 degrees out of phase with the anode voltage of such discharge device.

2. Apparatus for testing metal articles for longitudinal defects including in combination a test unit comprising primary and secondary windings, means for placing an article to be tested in inductive relation to said windings, means for causing a current of substantially predetermined magnitude and phase to flow thru the primary winding, means for impressing upon the secondary circuit a voltage of substantially constant predetermined phase and magnitude, and detecting means to determine the degree of shift in the phase angle of the current flowing in the secondary circuit.

3. Apparatus for testing metal articles for longitudinal defects including in combination test units each comprising primary and secondary windings, means for causing a current of substantially predetermined magnitude and phase to flow thru the primary windings, means for causing a current of substantially predetermined magnitude and phase normally to flow thru the secondary windings, and defect indicating apparatus including means to determine shifts of the phase angle of current flowing in the secondary windings.

4. The apparatus set forth in claim 3 in which the last said means comprises a Thyratron tube circuit.

5. The apparatus set forth in claim 3 in which the last said means includes an amplifier and a Thyratron tube circuit.

6. The apparatus set forth in claim 3 in which the last said means includes a phase control device, an amplifier and a Thyratron tube circuit.

7. The method of testing metal articles which comprises passing current circumferentially around a magnetic metal article to be tested, while rendering the article substantially non-magnetic with respect to such current by exposing the article to a direct current field of strength sufficient substantially to saturate the article magnetically, and detecting defects in the article by determining the portions of the article which cause variations of a predetermined nature and amount in the current flowing circumferentially in the article.

8. The method of testing metal articles which comprises passing current circumferentially around a magnetic metal article to be tested, inducing a flow of current in a secondary conductor around the article, rendering the article substantially non-magnetic with respect to the current flowing in the article by exposing the article to a direct current field of strength sufficient to substantially saturate the article magnetically and detecting the defects in the article by determining the portions of the article which cause variations of a predetermined nature and amount in the current flowing in the secondary conductor.

9. The method of testing metal articles which comprises passing current in a conductor around a magnetic metal article, inducing a flow of current in a secondary conductor around the article, rendering the article substantially non-magnetic with respect to the current flowing in the secondary circuit, controlling the flow of current in a circuit associated with the secondary circuit by means of variations of a predetermined nature and amount in the current flowing in said secondary circuit, and utilizing the current flowing in the associated circuit for indicating the location of defects to be detected in the article.

10. The method of testing metal articles which comprises passing current in a conductor around a magnetic metal article, inducing a flow of current circumferentially around the said article, rendering the article substantially non-magnetic with respect to the current flowing therein, controlling the flow of current in a circuit associated inductively with the article by means of variations of a predetermined nature and amount in the current flowing in the article, and utilizing the flow of current in the associated circuit to indicate the location of defects of a predetermined magnitude in the article to be tested.

11. The method of testing metal articles which includes the steps of passing current in a conductor extending circumferentially around a magnetic metal article to be tested, inducing a flow of current thruout the entire circumferential length of such article and also inducing a flow of current in a secondary conductor extending circumferentially around the article, rendering the article substantially non-magnetic with respect to the current flowing in the first said conductor by exposing the article to a magnetic field of sufficient strength substantially to saturate the article magnetically, and observing variations of a predetermined nature and amount in the current flowing in the article.

12. The method of testing metal articles which includes the steps of passing current in a conductor circumferentially around a magnetic metal article to be tested, inducing a flow of current in secondary conductors, one of which extends around the article, rendering the material of the article substantially non-magnetic with respect to the current flowing in the first said conductor by exposing the article to a magnetic field of strength sufficient substantially to saturate the article magnetically, and detecting defects in the article by observing variations of a predetermined nature and amount in the current flowing in the secondary conductor around the article.

13. The method of testing metal articles which includes the steps of inducing a flow of current circumferentially in a magnetic metal article, rendering the article substantially non-magnetic in respect to said inducing current and observing the effect on the current caused by variations of resistances in the path of the induced current in the article.

14. The method of testing metal articles which includes the steps of inducing a flow of current circumferentially in a magnetic metal article, rendering the article at least partially non-magnetic in character with respect to said inducing current, separating the magnetic effects of the article on said current from the effects of variations in resistances on said current, and observing the effects on said current caused by such variations in resistances.

15. The method of testing for defects metal articles composed of magnetic material, which comprises rendering such material substantially non-magnetic with respect to a varying energizing current flowing around the article, passing exciting current circumferentially in the article, and determining the reactions of the article on the exciting current.

16. The method of testing for defects metal articles composed of magnetic material, which comprises rendering such material substantially non-magnetic with respect to an energizing current, passing exciting current circumferentially in the article, and determining the reactions of the article on the exciting current.

17. The method of testing metal articles for defects which comprises subjecting the material of the article to a sufficiently high degree of magnetic saturation to render the material substantially non-magnetic with respect to an energizing current, passing energizing current in a conductor around the article in a manner to induce a flow of current in a secondary conductor around the article, and determining the reactions of the article on the current flowing in the said secondary conductor.

18. The method of testing magnetic metallic articles for defects which comprises passing energizing current in a conductor around the article while the article is subjected to a sufficiently high degree of magnetic saturation to render the material of the article substantially non-magnetic with respect to the energizing current, and determining the reactions of the article on said energizing current.

19. The method of testing magnetic metallic articles for defects which comprises passing energizing current in a conductor around an article in a manner to induce a flow of current in a secondary conductor around the article, simultaneously passing magnetizing current in a conductor around the article sufficient in amount to render the article substantially non-magnetic with respect to the energizing current, and determining the reactions of the article on the current flowing in the secondary conductor.

20. The method of testing metal articles which comprises simultaneously passing current around a standard satisfactory magnetic metal article and around a similar article to be tested, rendering the material of the articles substantially non-magnetic to said current by creating in said articles a high degree of magnetic saturation during the time the said current is flowing, and comparing the reactions of said articles on said current.

21. The method of testing metal articles for defects which comprises simultaneously passing energizing current around a standard metal article and around a similar metal article to be tested thereby inducing the flow of current in secondary conductors around the articles, rendering the material of the articles substantially non-magnetic with respect to the energizing current by subjecting the articles to a sufficiently high degree of magnetic saturation while the energizing current is flowing, and comparing the reactions of said articles on the secondary currents.

22. Apparatus for testing metal articles including in combination coiled primary and secondary inductively positioned conductors having co-axial air cores thru which conductors an article of substantially uniform cross-section may be passed axially, direct current means for magnetically saturating the article within said conductors, and defect detecting means cooperating with said secondary conductor.

23. The apparatus set forth in claim 22 in which the defect detecting means includes an amplifying device, and means for indicating reactions of the article on current flowing in the secondary.

24. The method of testing metal articles which includes the steps of inducing a flow of current thruout the entire circumferential length of such an article and simultaneously therewith electrically and selectively observing the variations in said current caused by the variations of resistance to the current path separately from variations caused by magnetic properties, said step of observing such variations including the determination of phase-angle shifts caused by the aforesaid variations in resistance.

25. The method of testing metal articles which includes the steps of inducing a flow of current thruout the entire circumferential length of such an article, inducing a flow of current in a secondary circuit around the article including a grid controlled, arc discharge device, having its grid and anode voltages adjusted and maintained about 180° out of phase with each other and positioned at the point of maximum sensitivity, and detecting variations in the current caused by a resistance of the article in the path of the induced current flowing therein by observing changes in the anode current.

26. The method of testing metal articles of substantially constant cross section for mechanical defects which includes the steps of inducing a flow of current throughout the entire circumferential length of such an article, inducing a flow of current in a conductor surrounding said article, simultaneously with the flow of current in the article electrically and selectively observing the variations in the current induced in the article which are caused by the resistance of mechanical defects in the current path, separately from variations caused by magnetic properties, the step of electrically and selectively observing said variations being carried out by observing variations in the current flowing in said secondary circuit, and locating the presence of such defects by noting the observed variations in said current.

27. Apparatus for testing metal articles for longitudinal defects, including in combination a test unit comprising primary and secondary windings having suitable means for receiving an article to be tested in inductive relation to said windings, means for causing a current of substantially predetermined magnitude and phase to flow thru the primary winding, means for causing a current of substantially predetermined magnitude and phase normally to flow thru the secondary winding, and means cooperating with the secondary winding for detecting variations in the article being tested, said means including a device to determine the degree of shift in phase angle of the current flowing in the secondary winding.

28. The method of locating defects in a metallic non-magnetic article comprising progressively moving the article relative to a substantially constant high-frequency alternating exciting field and thereby inducing flow in the article of circulating currents flowing in a direction normal to the prevailing direction of defects and which creates a counter-magnetic field external to the article, applying said counter-magnetic field to induce opposed detecting currents externally of the article, said counter-magnetic field being symmetrical and said opposed detecting currents substantially neutralizing each other in regions of the article free from defects, and a defect in the article causing distortion of said counter-magnetic field as the defect moves through said induction field and thereby causing a shift in the relative phase angle of said opposed detecting currents productive of an unbalancing of said opposed detecting currents, and utilizing said unbalanced voltage to locate the defect.

29. The method of testing for defects metal articles composed of magnetic material, which comprises rendering such material substantially non-magnetic with respect to an alternating current flowing around the article, passing exciting current circumferentially in the article, and determining the reactions of the article on the exciting current.

30. The method of testing metal articles for defects which comprises simultaneously passing energizing current around a standard satisfactory article and around a similar article to be tested, rendering the material of said articles substantially non-magnetic with respect to the energizing current by subjecting the article to a sufficiently high degree of magnetic saturation during the time the energizing current is flowing, and comparing the reactions of said articles on such current, independently of the magnetic character of the material of the article.

31. Apparatus for testing metal articles including in combination substantially similar units each comprising coiled primary and secondary conductors having co-axial openings through which an article of substantially uniform cross-section may be passed axially, direct current means for magnetically saturating the articles in the said units, and defect detecting means cooperating with said secondary conductors.

32. The apparatus set forth in claim 31 in which the defect detecting means includes an amplifying device, and means for indicating reactions of the articles on current flowing in the secondaries.

33. The method of locating deflects in a metallic non-magnetic article, comprising progressively moving the article relative to a substantially constant high-frequency alternating exciting field and thereby inducing flow in the article of circulating currents flowing in a direction normal to the prevailing direction of defects and which create a counter-magnetic field external to the article, applying said counter-magnetic field to induce a detector current externally of the article, said counter-magnetic force and the flow of said induced currents being symmetrical in regions free from defects and being distorted by a defect as it moves through the exciting field and thereby altering the normal symmetry of the wave, and applying said counter-magnetic field to determine wave shape of the induced voltage in the detector circuit and thereby locate defects by comparing the altered wave shape due to a defect with its normal shape.

34. The method of testing metal articles for defects which comprises passing energizing current around the article, and locating defects in the article by observing defect caused phase angle shifts caused by the article independently of the magnetic character of the material of the article.

35. The method of testing metal articles which comprises simultaneously passing current around a magnetic metal article to be tested and rendering the material of the article substantially non-magnetic to said current by creating a high degree of magnetic saturation in the portion of the said article around which the said current is flowing, and determining the reactions of said article on said current.

36. Apparatus for testing metal articles including in combination means for passing current around an article to be tested, means for creating a high degree of magnetic saturation in the portion of the article around which said current is passing and means for determining reactions of the article on said current.

37. Apparatus for testing metal articles including in combination coiled primary and secondary, inductively positioned, coaxial conductors having an axial opening through which an article of substantially uniform cross section may be passed axially, the primary having means to connect it to a source of alternating current, direct current means for magnetically saturating the portion of the article within said conductors, and deflect detecting means cooperating with said secondary conductor for determining reactions of the article on current flowing around said article.

HORACE C. KNERR.
CECIL FARROW.

CERTIFICATE OF CORRECTION.

Patent No. 2,065,379.   December 22, 1936.

HORACE C. KNERR, ET AL.

It is hereby certified that error appears in the printed specification of the above numbered patent requiring correction as follows: Page 2, first column, line 2, for the word "properly" read property; page 5, second column, line 41, claim 33, for "deflects" read defects; page 6, second column, line 7, claim 37, for "deflect" read defect; and that the said Letters Patent should be read with these corrections therein that the same may conform to the record of the case in the Patent Office.

Signed and sealed this 23rd day of February, A. D. 1937.

(Seal)

Henry Van Arsdale
Acting Commissioner of Patents.

is flowing, and determining the reactions of said article on said current.

36. Apparatus for testing metal articles including in combination means for passing current around an article to be tested, means for creating a high degree of magnetic saturation in the portion of the article around which said current is passing and means for determining reactions of the article on said current.

37. Apparatus for testing metal articles including in combination coiled primary and secondary, inductively positioned, coaxial conductors having an axial opening through which an article of substantially uniform cross section may be passed axially, the primary having means to connect it to a source of alternating current, direct current means for magnetically saturating the portion of the article within said conductors, and deflect detecting means cooperating with said secondary conductor for determining reactions of the article on current flowing around said article.

HORACE C. KNERR.
CECIL FARROW.

CERTIFICATE OF CORRECTION.

Patent No. 2,065,379.                                December 22, 1936.

HORACE C. KNERR, ET AL.

It is hereby certified that error appears in the printed specification of the above numbered patent requiring correction as follows: Page 2, first column, line 2, for the word "properly" read property; page 5, second column, line 41, claim 33, for "deflects" read defects; page 6, second column, line 7, claim 37, for "deflect" read defect; and that the said Letters Patent should be read with these corrections therein that the same may conform to the record of the case in the Patent Office.

Signed and sealed this 23rd day of February, A. D. 1937.

(Seal)

Henry Van Arsdale
Acting Commissioner of Patents.

CERTIFICATE OF CORRECTION.

Patent No. 2,065,379.  December 22, 1936.

HORACE C. KNERR, ET AL.

It is hereby certified that error appears in the printed specification of the above numbered patent requiring correction as follows: Page 2, first column, line 2, for the word "properly" read property; page 5, second column, line 41, claim 33, for "deflects" read defects; page 6, second column, line 7, claim 37, for "deflect" read defect; and that the said Letters Patent should be read with these corrections therein that the same may conform to the record of the case in the Patent Office.

Signed and sealed this 23rd day of February, A. D. 1937.

Henry Van Arsdale
Acting Commissioner of Patents.

(Seal)